(12) United States Patent
Ryu et al.

(10) Patent No.: US 10,032,483 B2
(45) Date of Patent: Jul. 24, 2018

(54) SUMMARY IMAGE BROWSING SYSTEM AND METHOD

(71) Applicant: Hanwha Techwin Co., Ltd., Changwon-si (KR)

(72) Inventors: Yeon Geol Ryu, Changwon-si (KR); Dong Jun Park, Changwon-si (KR); Hak Chul Shin, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 9 days.

(21) Appl. No.: 15/107,011

(22) PCT Filed: Mar. 26, 2014

(86) PCT No.: PCT/KR2014/002533
§ 371 (c)(1),
(2) Date: Jun. 21, 2016

(87) PCT Pub. No.: WO2015/108236
PCT Pub. Date: Jul. 23, 2015

(65) Prior Publication Data
US 2017/0040036 A1 Feb. 9, 2017

(30) Foreign Application Priority Data
Jan. 14, 2014 (KR) ........................ 10-2014-0004701

(51) Int. Cl.
*G11B 27/031* (2006.01)
*H04N 21/8549* (2011.01)
(Continued)

(52) U.S. Cl.
CPC ............ *G11B 27/031* (2013.01); *G06T 11/60* (2013.01); *H04N 21/8549* (2013.01);
(Continued)

(58) Field of Classification Search
CPC .. G11B 27/031; G06T 7/2006; H04N 21/8549
See application file for complete search history.

(56) References Cited

U.S. PATENT DOCUMENTS 7,868,912 B2 1/2011 Venetianer et al.
8,818,038 B2 8/2014 Peleg et al.
(Continued)

FOREIGN PATENT DOCUMENTS

JP 2006279827 * 10/2006
JP 4325075 B2 9/2009
(Continued)

OTHER PUBLICATIONS

International Search Report (PCT/ISA/210), dated Oct. 10, 2014, issued by the International Searching Authority in counterpart International Patent Application No. PCT/KR2014/002533.
(Continued)

*Primary Examiner* — Mishawn Hunter
(74) *Attorney, Agent, or Firm* — Sughrue Mion, PLLC

(57) ABSTRACT

An embodiment of the present invention provides a summary image browsing system and method. A summary image browsing method of the present invention may comprise the steps of: tracking motion trajectory of an object from an input video; extracting the object from the input video and then generating a series of object segments; and synthesizing the series of object segments with a background image along the motion trajectory of the object and generating a summary image having a thickness according to an occurrence time interval for each object extracted from the input video.

20 Claims, 12 Drawing Sheets

(51) Int. Cl.
   *G06T 11/60* (2006.01)
   *G06F 3/0481* (2013.01)
(52) U.S. Cl.
   CPC ...... *G06F 3/04817* (2013.01); *G06T 2200/24* (2013.01); *G06T 2207/30241* (2013.01)

(56) References Cited

U.S. PATENT DOCUMENTS

| | | | |
|---|---|---|---|
| 2004/0096085 A1* | 5/2004 | Matsumoto | A63B 24/0003 382/107 |
| 2004/0207656 A1 | 10/2004 | Lee et al. | |
| 2007/0006263 A1* | 1/2007 | Uno | G11B 27/034 725/42 |
| 2008/0098316 A1 | 4/2008 | Declan | |
| 2008/0152193 A1* | 6/2008 | Takamori | G06T 7/246 382/103 |
| 2008/0298767 A1 | 12/2008 | Jeong et al. | |
| 2010/0067808 A1* | 3/2010 | Matsuzaki | A61B 1/041 382/218 |
| 2013/0091470 A1 | 4/2013 | Sciammarella et al. | |
| 2013/0183022 A1* | 7/2013 | Suzuki | G06K 9/00718 386/241 |

FOREIGN PATENT DOCUMENTS

| | | | |
|---|---|---|---|
| JP | 2012010265 | * | 1/2012 |
| JP | 4920395 B2 | | 4/2012 |
| KR | 10-0547370 B1 | | 1/2006 |
| KR | 10-2007-0101336 A | | 10/2007 |
| KR | 10-2008-0105387 A | | 12/2008 |
| KR | 10-2009-0117771 A | | 11/2009 |
| KR | 10-1256873 B1 | | 4/2013 |
| KR | 10-1264667 B1 | | 5/2013 |
| WO | 2010/044186 A1 | | 4/2010 |

OTHER PUBLICATIONS

PCT/ISA/220, dated Oct. 10, 2014, issued by the International Searching Authority in counterpart International Patent Application No. PCT/KR2014/002533.

Written Opinion (PCT/ISA/237), dated Oct. 10, 2014, issued by the International Searching Authority in counterpart International Patent Application No. PCT/KR2014/002533.

* cited by examiner

SUMMARY IMAGE BROWSING SYSTEM AND METHOD

TECHNICAL FIELD

An embodiment of the present invention relates to a system and method for browsing summary images.

BACKGROUND ART

As demand for multimedia services such as images or videos has increased and portable multimedia devices have been widely distributed, a need for efficient multimedia searching and browsing systems able to manage a vast amount of multimedia data and rapidly and accurately find and provide desired content to consumers has increased.

DETAILED DESCRIPTION OF THE INVENTION

Technical Problem

The present invention provides an image browsing system and method that may allow a user to conveniently recognize a search result.

Technical Solution

A method for browsing summary images according to an embodiment of the present invention may include: tracking a motion trajectory of an object from an input video; extracting the object from the input video and generating a series of object segments; and synthesizing the series of object segments with a background image along the motion trajectory of the object and generating a summary image having a thickness according to an occurrence time interval for each object extracted from the input video.

The summary image may include a display region and a text region indicating information of the object, and a specific color may be assigned to an edge of the display region according to a category of the object.

The series of object segments may be arranged not to overlap the background image along the motion trajectory of the object, wherein each of the object segments in the series of object segments is displayed in a specific color or a specific figure and has a size that varies according to a position thereof in the background image.

The method may further include aligning and displaying, along a time axis in an order in which objects appear over time, one or more summary images matching a search condition, from among summary images generated according to the objects.

The method may further include: receiving an input for changing view points of the aligned summary images; and rotating and moving the aligned summary images based on transformation relationships respectively assigned to the aligned summary images and displaying the rotated and moved summary images.

The method may further include: detecting an operation of dragging and dropping a first summary image to a second summary image, from among the aligned summary images; and aligning and displaying a synthesized summary image, which is obtained by synthesizing the first summary image with the second summary image, with remaining summary images.

The method may further include aligning and displaying a synthesized summary image, which is obtained by synthesizing one or more summary images whose appearance durations partially overlap, from among the aligned summary images, with remaining summary images.

The displaying of the synthesized summary image may include aligning and displaying a synthesized summary image, which is obtained by synthesizing a summary image selected by a user with one or more summary images, from among the aligned summary images, whose appearance durations partially overlap, with remaining summary images.

The method may further include: receiving a request to re-align the aligned summary images according to categories; and classifying the aligned summary images according to the categories, and aligning and displaying the classified summary images in each of the categories along the time axis in an order in which objects appear over time.

The method may further include: receiving an input for selecting a summary image from among the aligned summary images; and highlighting the selected summary image, and separately displaying the highlighted summary image so that the highlighted summary image overlaps remaining summary images.

The method may further include: adding a replay icon to the highlighted summary image; and when the replay icon is selected, replaying an object of the highlighted image in a time order.

The method may further include: receiving a request to remove or add a background from or to one or more summary images from among the aligned summary images; and displaying the one or more summary images after removing or adding the background from or to the one or more summary images.

The method may further include clustering summary images that are searched according to search conditions.

A system for browsing summary images according to an embodiment of the present invention may include: an object extractor configured to track a motion trajectory of an object from an input video and generate a series of object segments by extracting the object from the input video; and a summary image generator configured to synthesize the series of object segments with a background image along the motion trajectory of the object and generate a summary image having a thickness according to an appearance time interval for each object extracted from the input video.

The summary image may include a display region and a text region indicating information of the object, and a specific color is assigned to an edge of the display region according to a category of the object, and the series of object segments may be arranged not to overlap the background image along the motion trajectory of the object, wherein each of the object segments in the series of object segments is displayed in a specific color or a specific figure and has a size that varies according to a position thereof in the background image.

The system may further include a browsing engine configured to align and display, along a time axis in an order in which objects appear over time, one or more summary images matching a search condition from among summary images generated according to objects.

The browsing engine may be configured to, rotate and move, in response to a request to change view points of the aligned summary images, the aligned summary images based on transformation relationships respectively assigned to the aligned summary images and display the rotated and moved summary images.

The browsing engine may be configured to align and display, according to a user' selection or partially overlapping object appearance durations, a synthesized summary image, which is obtained by merging some summary images from among the aligned summary images, with remaining summary images.

The browsing engine may be configured to highlight a summary image selected from among the aligned summary images and separately display the highlighted summary image so that the highlighted summary image overlaps remaining summary images, wherein a replay icon is added to the highlighted image, and when an input for selecting the replay icon is received, an object in the highlighted summary image is replayed in a time order.

The browsing engine may be configured to cluster, according to search conditions, summary images that are found.

Advantageous Effects of the Invention

According to an embodiment of the present invention, since object and image-based summary images are generated and aligned in a three-dimensional (3D) structure, movements of objects may be recognized immediately, thereby improving user convenience.

BEST MODE

Figure 1:
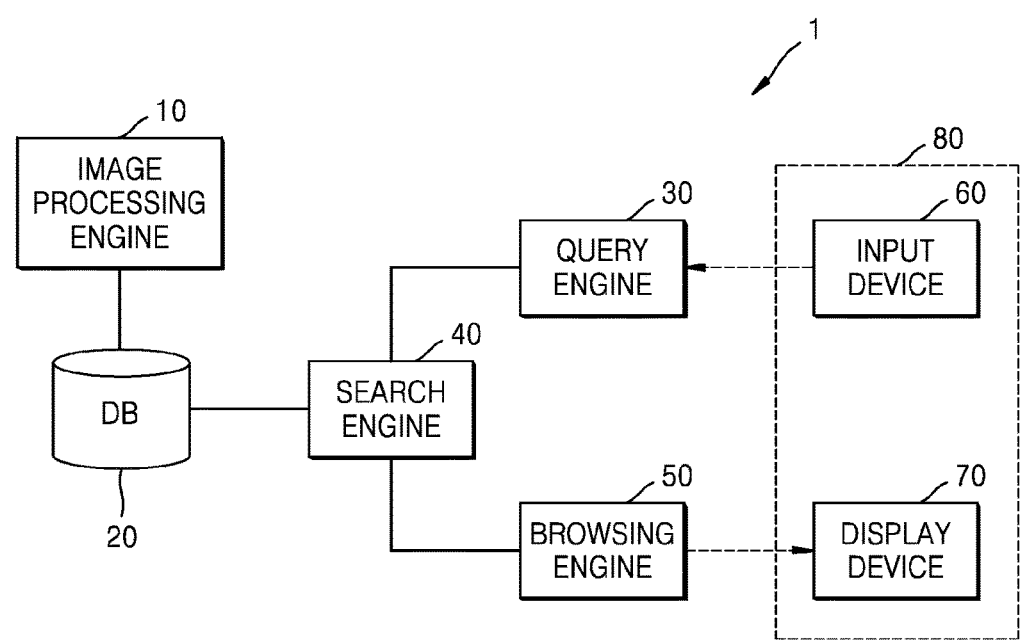
FIG. 1 is a block diagram schematically illustrating an image browsing system according to an embodiment of the present invention.

A method for browsing summary images according to an embodiment of the present invention may include: tracking a motion trajectory of an object from an input video; extracting the object from the input video and generating a series of object segments; and synthesizing the series of object segments with a background image along the motion trajectory of the object and generating a summary image having a thickness according to an occurrence time interval for each object extracted from the input video.

Mode of the Invention

The present invention may include various embodiments and modifications, and exemplary embodiments thereof will be illustrated in the drawings and will be described herein in detail. It should be understood, however, that there is no intent to limit exemplary embodiments of the invention to the particular forms disclosed, but conversely, exemplary embodiments of the invention are to cover all modifications, equivalents, and alternatives falling within the spirit and scope of the present invention. In the following description of the present invention, a detailed description of known functions and configurations incorporated herein will be omitted when it may make the subject matter of the present invention unclear.

It will be understood that, although the terms first, second, etc. may be used herein to describe various elements, these elements should not be limited by these terms. These terms are only used to distinguish one element from another.

The terminology used herein is for the purpose of describing exemplary embodiments only and is not intended to be limiting of the present invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof, but do not preclude the presence or addition of one or more other features, integers, steps, operations, elements, components, and/or groups thereof.

Embodiments of the present invention may be described in terms of functional block components and various processing steps. Such functional blocks may be realized by any number of hardware and/or software components configured to perform the specified functions. For example, embodiments of the present invention may employ various integrated circuit components, e.g., memory elements, processing elements, logic elements, look-up tables, and the like, which may carry out a variety of functions under the control of one or more microprocessors or other control devices. Similarly, where the elements of an embodiment of the present invention are implemented using software programming or software elements, an embodiment of the invention may be implemented with any programming or scripting language such as C, C++, Java, assembler, or the like, with the various algorithms being implemented with any combination of data structures, objects, processes, routines, or other programming elements. Functional aspects may be implemented in algorithms that are executed on one or more processors. Furthermore, embodiments of the present invention could employ any number of conventional techniques for electronics configuration, signal processing, and/or data processing. The words "mechanism", "element", "means", and "configuration" are used broadly and are not limited to mechanical or physical embodiments, but can include software routines in conjunction with processors, etc.

Figure 2:
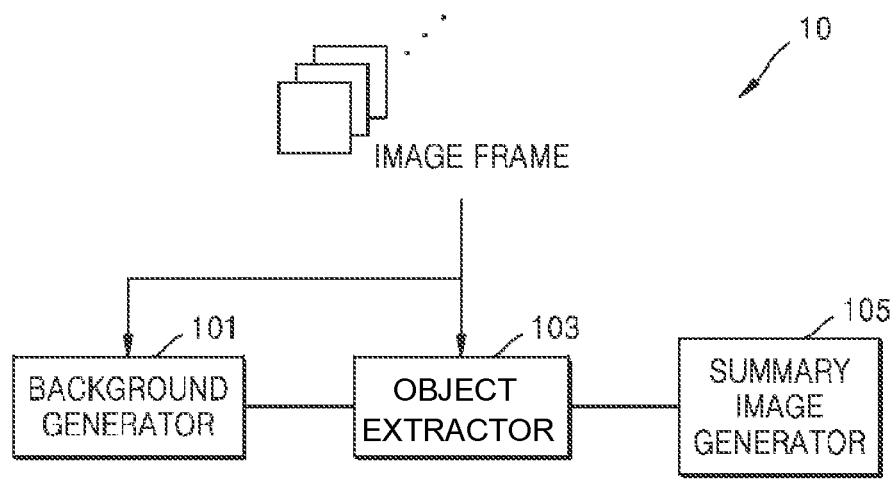
FIG. 2 is a block diagram schematically illustrating an image processing engine of FIG. 1.

FIG. 1 is a block diagram schematically illustrating an image browsing system 1 according to an embodiment of the present invention. FIG. 2 is a block diagram schematically illustrating an image processing engine 10 of FIG. 1.

Referring to FIG. 1, the image browsing system 1 may show a search result to a user and may perform a series of processes so that the user recognizes the search result. The image browsing system 1 may include the image processing engine 10, a database 20, a query engine 30, a search engine 40, and a browsing engine 50.

The image processing engine 10 may perform image analysis to obtain information about whether an object appears or disappears, a motion of the object is detected, or an image is turned off in an input video. Also, the image processing engine 10 may perform background detection, foreground and object detection, object counting, camera tampering detection, and face detection, etc. Also, the image processing engine 10 may obtain information about a brightness, a color, a texture, and a shape of an image.

The image processing engine 10 may include a background generator 101, an object extractor 103, and a summary image generator 105.

The background generator 101 may generate a background image by extracting a background from a plurality of image frames of an input video. The background generator 101 may determine a still region in the plurality of image frames as a background and may generate a background image. In an embodiment of the present invention, a method of generating a background image is not specifically limited, and may be any of various well-known methods.

The input video may be a video that is directly transmitted from a camera (not shown) that is an image sensor connected to the image browsing system 1, a video that is stored in a digital video recorder (DVR) or a network video recorder (NVR) connected to the image browsing system 1, or a video that is input in any of various paths through a network (not shown).

The object extractor 103 may determine a moving region from the plurality of image frames as an object of interest and may track a motion trajectory of the object. The object extractor 103 may obtain tracking information of the object in the video by collecting information about a change in the object between continuous image frames.

Also, the object extractor 103 may generate a series of object segments by extracting the object from the plurality of image frames. The object segments may be blobs that surround the object. Since a size of the object is changed according to a position thereof in the image frames, a size (e.g., a height or a width) of each of the object segments may be accordingly changed. The object extractor 103 may extract the object in consideration of an importance along the tracked motion trajectory. The importance may be determined in consideration of a degree of change along the motion trajectory direction. The object extractor 103 may omit extracting the object from some image frames according to the importance.

The summary image generator 105 may generate a summary image by synthesizing the series of object segments with the background image along the motion trajectory of the object. In an embodiment of the present invention, the summary image is an object-based video summary image in which a continuous motion of the object does not overlap the background image.

The motion trajectory may have a zigzag shape since sizes of the object segments are changed and the object segments are arranged not to overlap one another. The summary image generator 105 may perform trajectory smoothing in order to display a smooth motion trajectory.

The summary image generator 105 may perform visualization in order to clearly distinguish the background and a foreground (e.g., the object). For example, the object may be displayed in a specific color or a specific figure (e.g., a square or a circle). One summary image is an image that summarizes a motion of one object for a predetermined period of time. Accordingly, a number of summary images generated in the input video may correspond to a number of detected objects. A thickness of each summary image may indicate an appearance duration from a time when an object appears to a time when the object disappears. Accordingly, a thickness of a summary image increases as an appearance duration increases.

Each summary image may include a display region in which a motion of an object is displayed and a text region indicating information of the object. A specific color may be assigned to an edge of the display region according to a category of the object. A color of the edge and a color of object segments are different from each other. Information about the category (e.g., a person, a car, or an animal) of the object, an appearance duration, the color of the object segments, etc. may be displayed as the information of the object in the text region.

The summary image generator 105 may index the motion trajectory, the object segments, the object information, and the summary image, and may store the indexed information as a database.

Also, the image processing engine 10 may analyze image and generate an event when the result of an image analysis is satisfy an event generation condition preset. The event may include a system event that is set in the system, for example, a case wherein a network error occurs or a new camera is set. Also, the event may include a user event that is set by the user, for example, when an object appears, an image specified by the user is generated (e.g., a face unrecognizable by the user appears), a screen color is changed, a motion occurs in a set region, an abnormal sound (e.g., a car tire friction sound (skid), a glass breaking ground, an alarm sound, or a collision sound) is generated, a sound specified by a user (e.g., a shout, a scream, or a cry) is generated, or a voice equal to or higher than a threshold value is generated.

The database 20 stores the input video and a video analysis result. The video analysis result may be stored as text or image-based metadata. The image processing engine 10 may structure and organize the metadata so that the metadata is easily searched for, and may store the structured and organized metadata in the database 20.

The query engine 30 may receive a search condition through an input device 60 operated by the user, analyze requirements of the user from the search condition, and reconstruct the search condition into a predefined type. For example, the user may input a time interval, a category (e.g., a person or a car) of the object, a color, a specific region (e.g., a region of interest (ROI)) of the background image, a specific line of the background image, a specification direction of the background image, etc. as the search condition.

The search engine 40 may access the database 20 according to the search condition and may search for and find necessary information. The search engine 40 may extract a summary image matching or similar to the search condition from the database 20.

The browsing engine 50 may render the found summary image on a display device 70 in real time. The browsing engine 50 may align and display one or more summary images that are generated according to objects matching the search condition along a time axis in an order of object appearance times. The browsing engine 50 may arrange the plurality of summary images on layers in a 3D space to form a 3D structure. That is, an earlier summary image is arranged on a more posterior layer than a later summary image.

At least a part of a summary image on a more posterior layer may be overlapped by a summary image on a more anterior layer, and the user may move and/or rotate each summary image in order to monitor the summary image. The browsing engine 50 may receive a control signal for changing view points of the aligned summary images, may change positions of the summary images based on transformation relationships respectively assigned to the summary images, and may display the summary images whose positions have been changed. The control signal for changing the view points may be a motion of a mouse or a wheel that rotates or moves around a defined axis or a motion of touch on a screen. In order to observe a summary image on a specific layer, the user may rotate or move the specific layer in a 3D space. Accordingly, a motion trajectory of an object of interest may be recognized at once from the summary image on the specific layer.

In an embodiment of the present invention, a 3D space is modeled into a set of planes (layers), and an independent transformation relationship may be assigned to each of the planes. The independent transformation relationship assigned to each plane may be a two-dimensional (2D) transformation relationship such as Affine or Homography. Since a 3D space in an embodiment of the present invention is comprised of several planes, when the user changes a view point, 3D rendering may be performed in real time at a high speed by using a plurality of 2D transformations.

The browsing engine 50 may receive a control signal for merging some summary images selected from the aligned summary images, and may align and display a synthesized summary image obtained by merging the selected summary images with remaining summary images. The merging control signal may be an operation of selecting a first summary image and dragging and dropping the first summary image to a second summary image. The browsing engine 50 may detect the selecting and dragging and dropping operation, and may generate a synthesized summary image obtained by merging the first summary image with the second summary image.

A summary image according to an embodiment of the present invention is a synthesized image and includes a background, a foreground, and a visualization element of the foreground. Accordingly, two or more summary images may be merged into one summary image. The browsing engine 50 may render object blobs, that is, segments, on the same background image according to appearance times and positions thereof. Accordingly, a summary image based on an interaction between different objects may be provided.

The browsing engine 50 may align and display, by automatic setting or user selection, a synthesized summary image, which is obtained by synthesizing one or more summary images, from among the aligned summary images, whose appearance durations partially overlap one another, with remaining summary images.

The browsing engine 50 may receive a control signal for re-aligning the aligned summary images according to categories, may re-classify the aligned summary images according to the categories, and may align and display the re-classified summary images along a time axis in an order of object appearance times in each of the categories.

The browsing engine 50 may receive a control signal for selecting a summary image from among the aligned summary images, may highlight the selected summary image, and may separately display the highlighted summary image so that the highlighted summary image overlaps remaining summary images. The browsing engine 50 may add a replay icon to the highlighted summary image, may receive a control image for activating the replay icon, and may continuously replay a motion of the object in the summary image. Alternatively, the browsing engine 50 may replay a video including a time interval of the summary image to be replayed.

The browsing engine 50 may receive a control signal for removing or adding a background from or to one or more summary images from among the aligned summary images and may display the summary images after removing or adding the background from or to the summary images.

The browsing engine 50 may receive a control signal for clustering summary images that are searched for according to search conditions and may cluster the summary images into one or more groups. The number of summary images included in each cluster indicates a size of the cluster and the size of the cluster indicates a probability that a search condition corresponding to the cluster occurs.

A user terminal 80, that is, a terminal used by the user or a security administrator who manages the image browsing system 1, may be a computer or a mobile terminal. The user may control the image browsing system 1 through the user terminal 80. The user terminal 80 may include the input device 60 that is a user interface for inputting a query (e.g., a search condition) to the image browsing system 1.

The input device 60 may be wiredly or wirelessly connected to the image browsing system 1 and generate input data for allowing the user to control an operation of the image browsing system 1. The input device 60 may include a keypad, a dome switch, a touchpad (e.g., a contact capacitive touchpad, a pressure resistive touchpad, an infrared beam sensing touchpad, a surface acoustic wave touchpad, an integral strain gauge touchpad, or a piezoelectric effect touchpad), a mouse, a remote controller, a jog wheel, and/or a jog switch. The user terminal 80 may set a display condition of a resultant image by modifying, adding to, or deleting the search condition by using the input device 60. The user terminal 80 may be used to align, merge, or replay the resultant image displayed by using the input device 60.

The display device 70 may provide the resultant image output from the browsing engine 50 to the user so that the user may monitor the displayed image. The display device 70 may provide visual information and/or auditory information to the user. The display device 70 may be a liquid crystal display (LCD) panel, an organic light-emitting display (OLED) panel, or an electrophoretic display (EPD) panel. The display device 70 may be a touch screen capable of receiving an input through a touch of the user and operating as an input interface.

Figure 3:
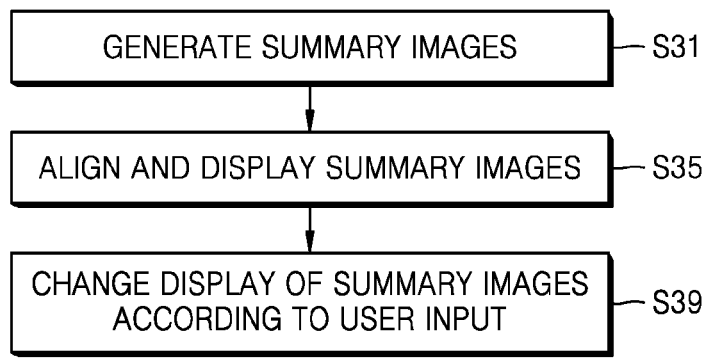
FIG. 3 is a flowchart schematically illustrating an image browsing method according to an embodiment of the present invention.
Figure 4:
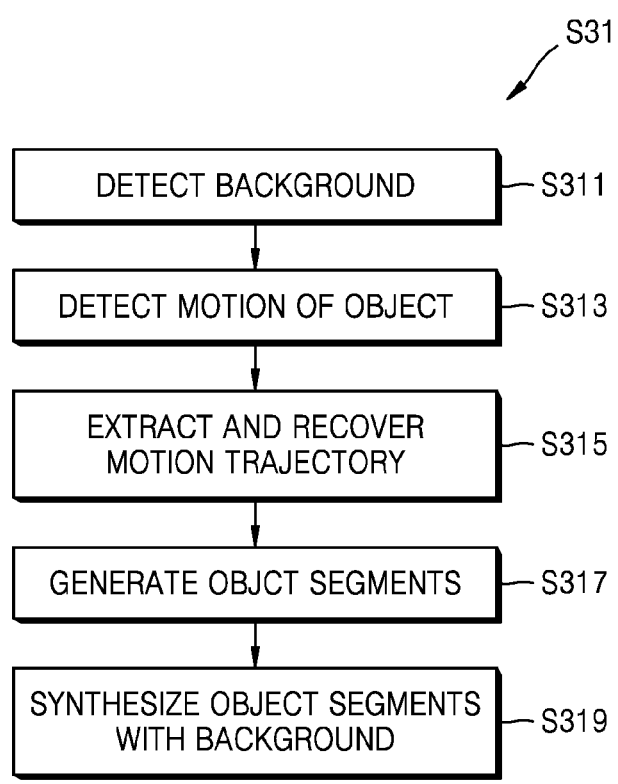
FIG. 4 is a flowchart schematically illustrating a method of generating summary image of FIG. 3.

FIG. 3 is a flowchart schematically illustrating an image browsing method according to an embodiment of the present invention. FIG. 4 is a flowchart schematically illustrating a method of generating a summary image of FIG. 3.

Referring to FIGS. 3 and 4, an image browsing system may generate a summary image from an input video (S31).

The image browsing system may detect a background from a plurality of image frames and may generate a background image (S311), and may detect a motion of an object (S313).

The image browsing system may continuously track an object of interest by using recognition, motion detection, and tracking in all of the image frames, and may extract and recover a motion trajectory of the object of interest (S315).

The image browsing system may extract the object from the plurality of image frames and may generate a series of object segments (S317). The object segments may be visualized in a specific color or a specific figure according to each object.

The image browsing system may generate a summary image by synthesizing the series of object segments with the background image along the motion trajectory of the object (S319). The object segments may be arranged not to overlap one another along the motion trajectory and sizes of the object segments may vary according to positions in the background image.

Figure 5:
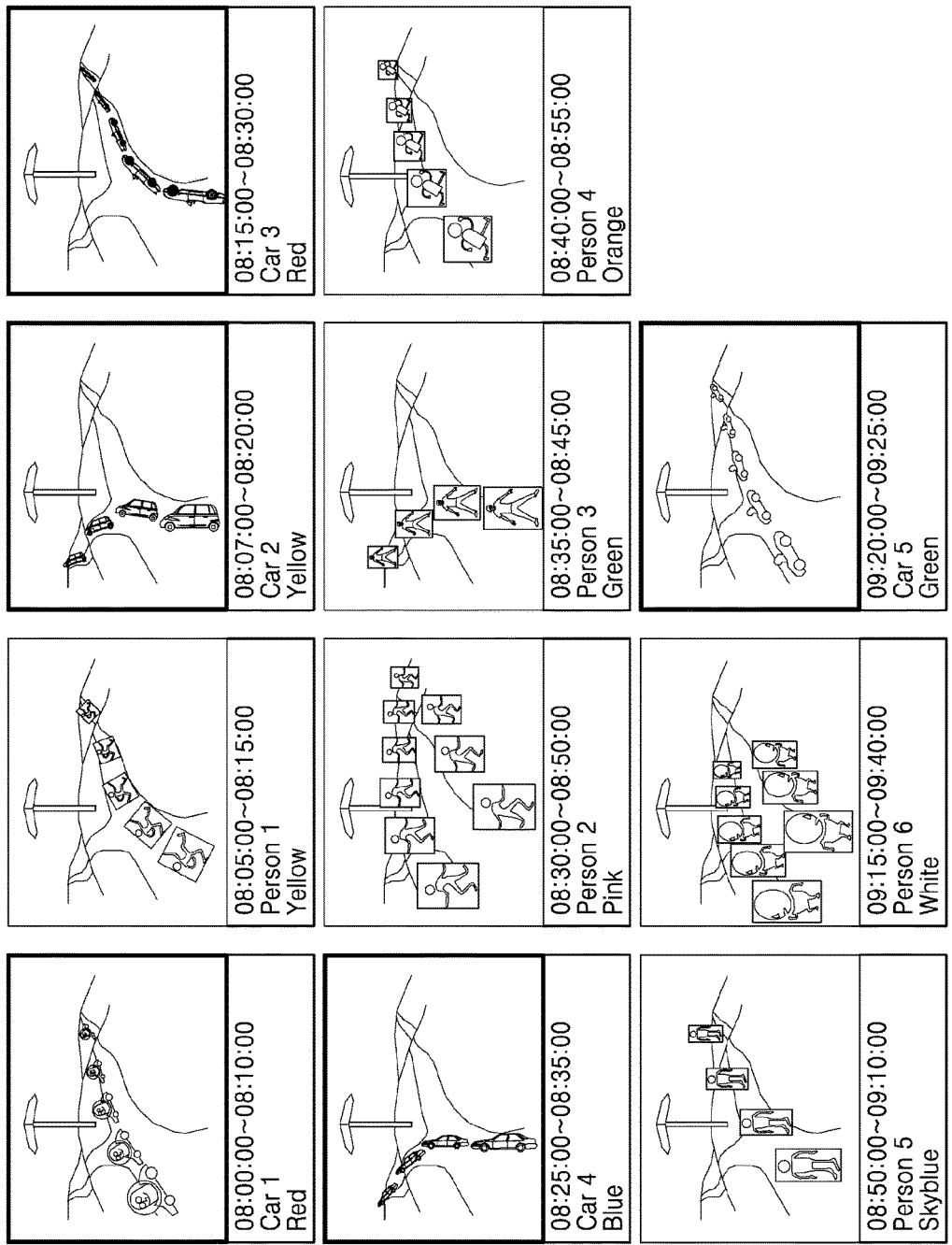
FIG. 5 is an exemplary view illustrating a plurality of summary images generated from an input video according to an embodiment of the present invention.

FIG. 5 is an exemplary view illustrating a plurality of summary images generated from an input video according to an embodiment of the present invention.

An image browsing system may separate an object of interest region from an input image by using motion information of an extracted object of interest, may finally synthesize the object of interest region with a background image, and may generate a summary image corresponding to the object of interest.

Referring to FIG. 5, one summary image summarizes a motion of one object. Accordingly, the number of summary images may correspond to the number of detected objects. In FIG. 5, six persons (i.e., person 1 through person 6) and five cars (i.e., car 1 through car 5) appeared and disappeared from 08:00 to 09:25, and thus eleven summary images were generated. Object segments synthesized with a background according to motion trajectories of objects may be displayed in different colors or different figures according to the objects. Sizes of the segments may vary according to positions of the objects in the background image.

Each of the summary images may include a display region that is surrounded by an edge in a specific color and a text region indicating information of an object. Summary images of objects belonging to the same category may be displayed with edges in the same color. In FIG. 5, a person is displayed with a blue edge (marked by a light line) and a car is displayed with a red edge (marked by a thick line). In the text region, information about a category of an object, an appearance duration, and a color of object segments may be displayed as information of the object. Although only the display region is distinguished with an edge having a color in FIG. 5, the text region may also be set to be surrounded with an edge having the same color as that of the display region. Objects belonging to the same category may be distinguished according to colors and/or numbering. A thickness of a summary image may be proportional to an appearance duration. For example, a thickness of a summary image increases as an appearance duration increases. That is, a summary image indicates a spatio-temporal volume of a motion trajectory of each object extracted from an original video.

Referring back to FIG. 3, the image browsing system may align and display the summary images that are generated according to objects along a time axis in an order of object appearance times (S35). The image browsing system may detect and display one or more summary images matching a search condition.

The image browsing system may arrange the summary images according to the objects on layers in a 3D space. That is, one layer indicates one object of interest, a summary image of an object that appears earlier is disposed on a more posterior layer in the 3D space and a summary image of an object that appears later is disposed on a more anterior layer.

A 3D browsing method according to an embodiment of the present invention may generate one summary image according to each object and may respectively arrange the generated summary images on layers in a 3D space in a time order, thereby improving user convenience.

Figure 6:
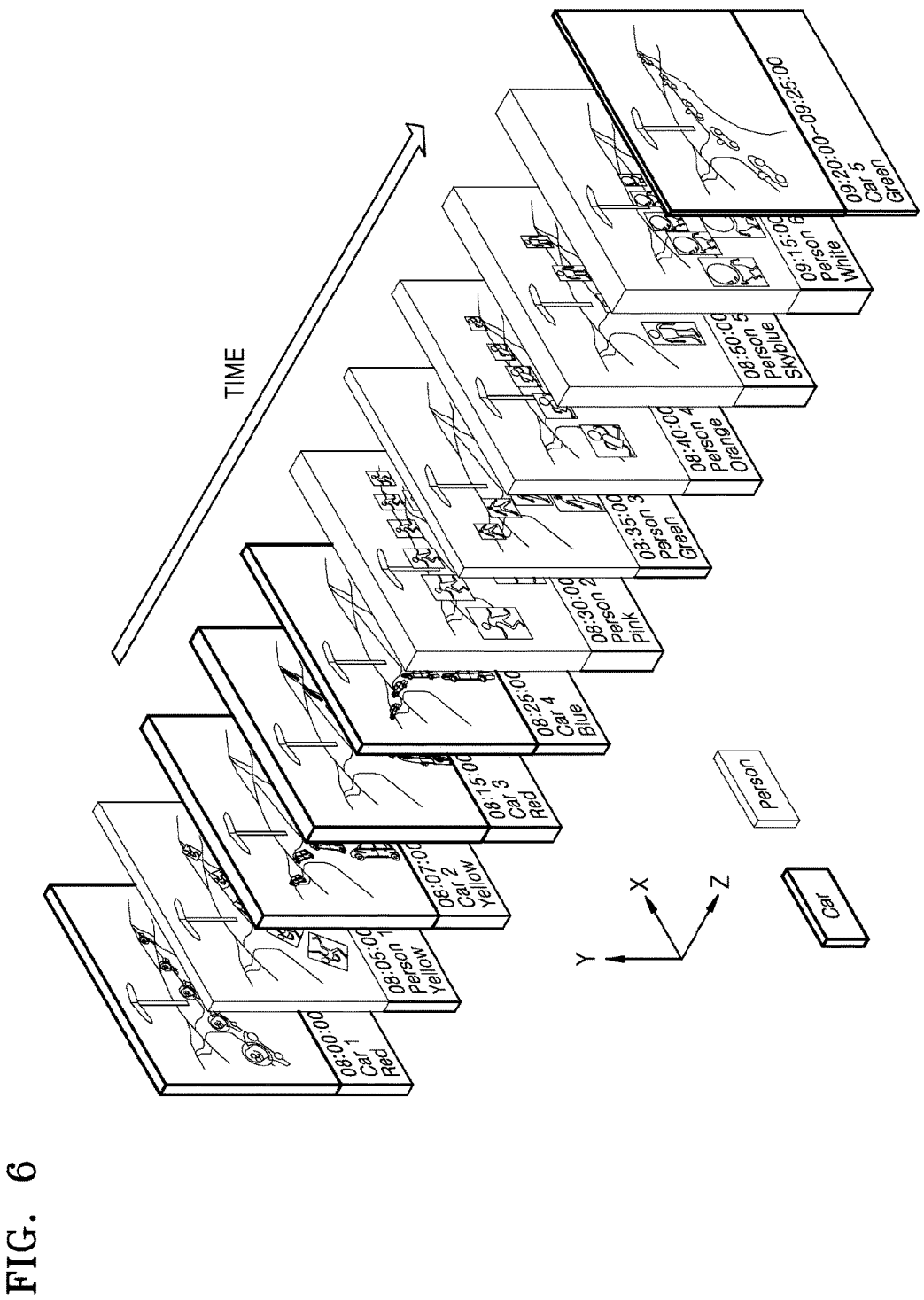
FIG. 6 is a view illustrating an example wherein summary images are aligned on a screen in a time order in a three-dimensional (3D) structure, according to an embodiment of the present invention.

FIG. 6 is a view illustrating an example wherein summary images are aligned on a screen in a time order in a 3D according to an embodiment of the present invention.

Referring to FIG. 6, a summary image of an object that appears first is disposed on a most posterior layer in a 3D space and an object that appears last is disposed on a most anterior layer. Summary images may have different thicknesses according to appearance durations. Description of a color of each category may be intuitively displayed on the bottom left of the screen.

The image browsing system may change display of the aligned summary images according to setting or a user input (S39).

The user may change a 3D view point in order to effectively see the summary images on all layers. The image browsing system may receive a view point change input that is input by the user, and may perform rendering in real time by independently rotating and/or moving each layer (or each summary image). The image browsing system may select, move, or hide a summary image on a specific layer or summary images on a plurality of layers by assigning an independent transformation relationship to each layer.

Figure 7:
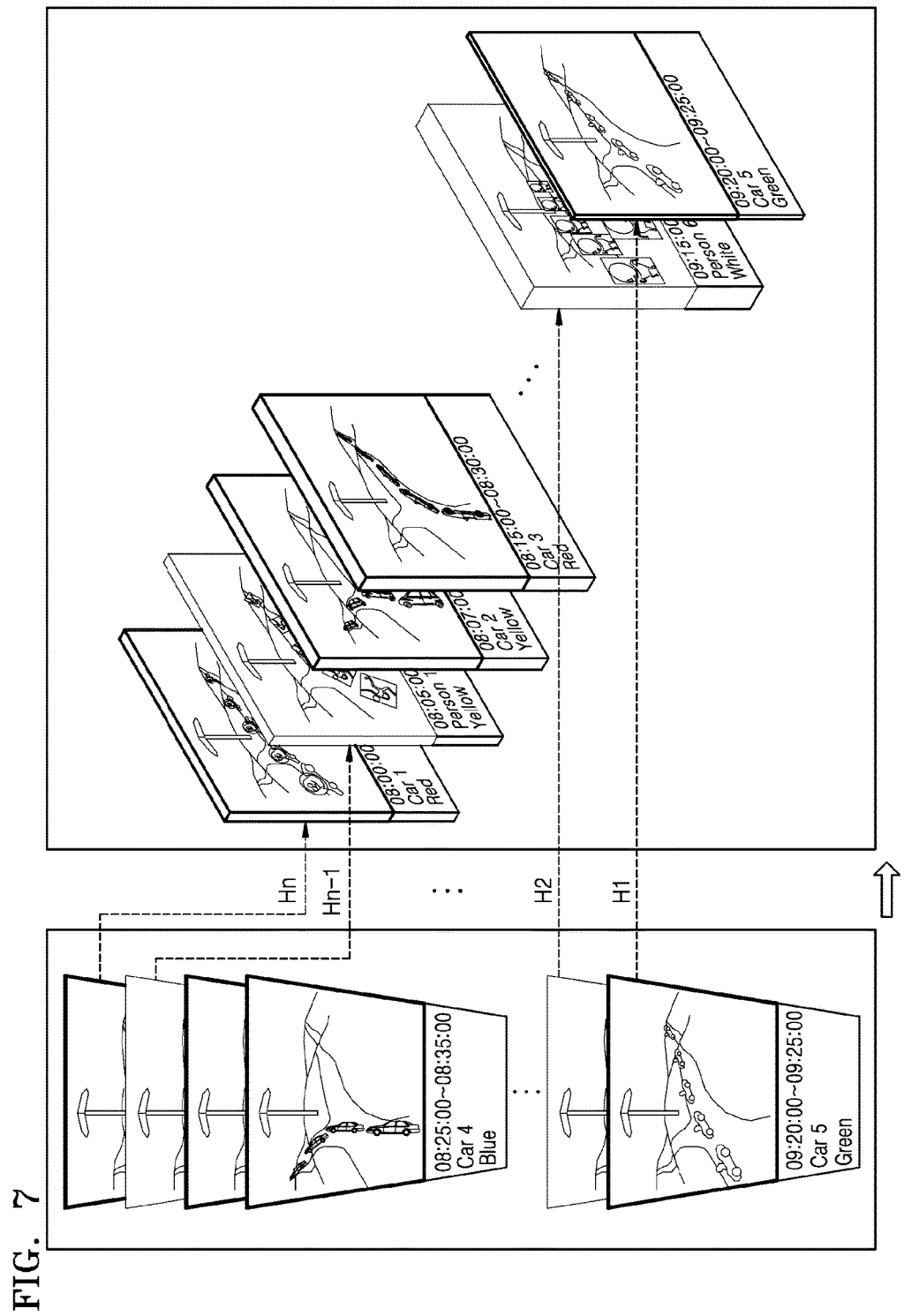
FIG. 7 is an exemplary view for explaining rotation of summary images aligned on a screen according to an embodiment of the present invention.

FIG. 7 is an exemplary view for explaining rotation of summary images aligned on a screen according to an embodiment of the present invention.

The aligned summary images may be rotated/moved along a plurality of preset axes. As shown in left side of FIG. 7, transformation relationships H1, H2, . . . , Hn−1, and Hn may be respectively set to the summary images aligned on a front surface of the screen, and as shown in right side of FIG. 7, the summary images may be individually or collectively rotated and/or moved according to the set transformation relationships.

The image browsing system may receive a request to re-align the aligned summary images according to categories, may classify the summary images according to categories of objects, and may align and display the summary images along a time axis in an order of object appearance times in each of the categories.

Figure 8:
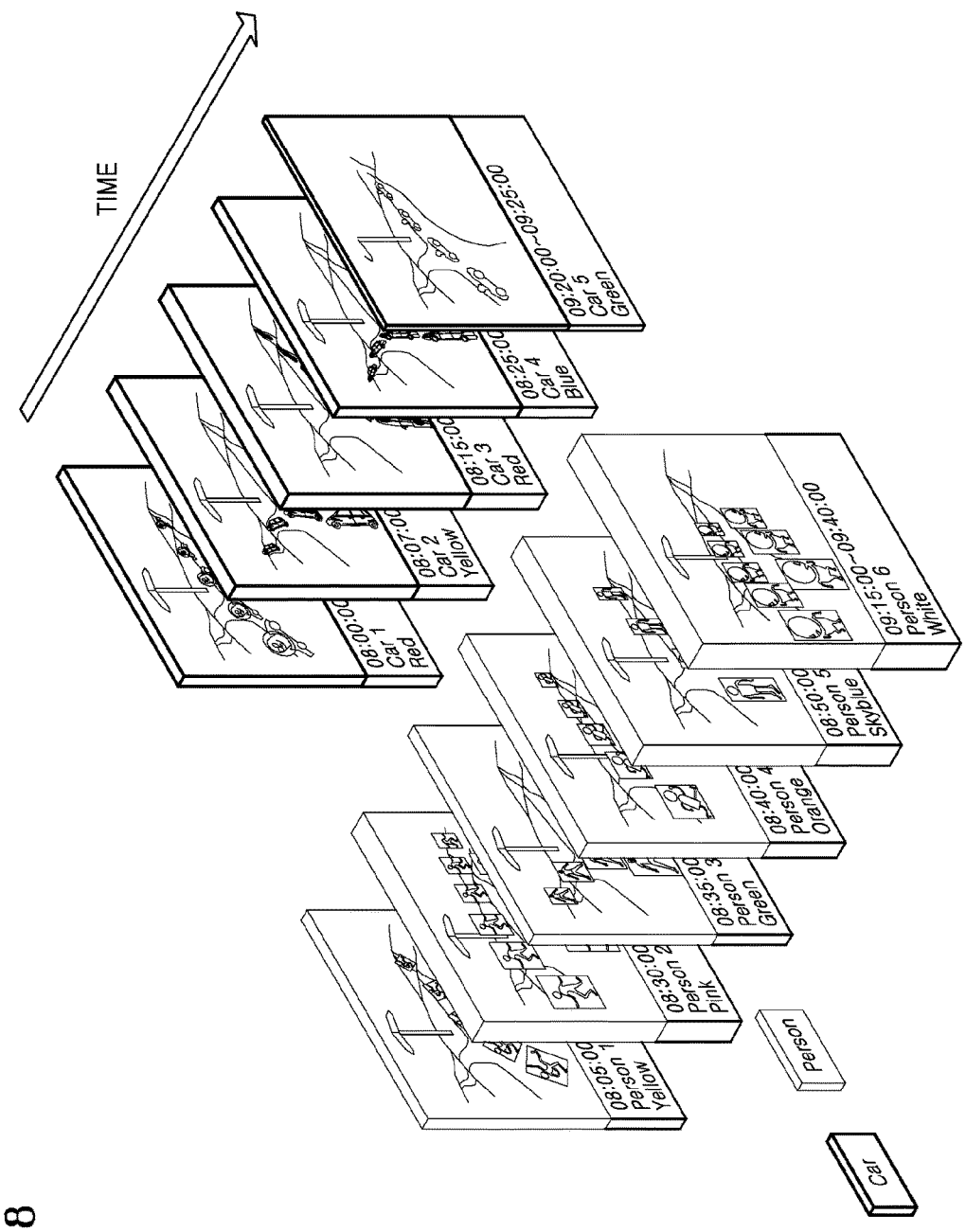
FIG. 8 is a view illustrating an example wherein summary images aligned on a screen are re-aligned according to categories according to an embodiment of the present invention.

FIG. 8 is a view illustrating an example wherein summary images aligned on a screen are re-aligned according to categories according to an embodiment of the present invention. FIG. 8 is an exemplary view illustrating a result obtained after the aligned summary images are classified into persons and cars.

Also, the image browsing system may associate the classification of the summary images with a search condition, thereby guaranteeing user convenience. For example, when the search condition includes a color, the summary images may be classified and visualized according to colors. Accordingly, the image browsing system may perform classification and visualization in accordance with the search condition that is required by the user.

The image browsing system may receive a request to merge two or more summary images from among the aligned summary images, may generate a synthesized summary image by merging selected summary images, and may align and display the synthesized summary image with remaining summary images.

A summary image on one layer includes one object information. When the user is to search for an interaction between a plurality of objects (e.g., between cars or between a car and a person), the image browsing system may merge summary images on a plurality of layers and may display a plurality of pieces of object information on a summary image on one layer. For example, the user may select a first summary image on a layer to be merged (e.g., by clicking on a mouse), may drag and drop the selected first summary image to a second summary image on a layer, and may merge the first and second summary images into a summary image on one layer.

Figure 9:
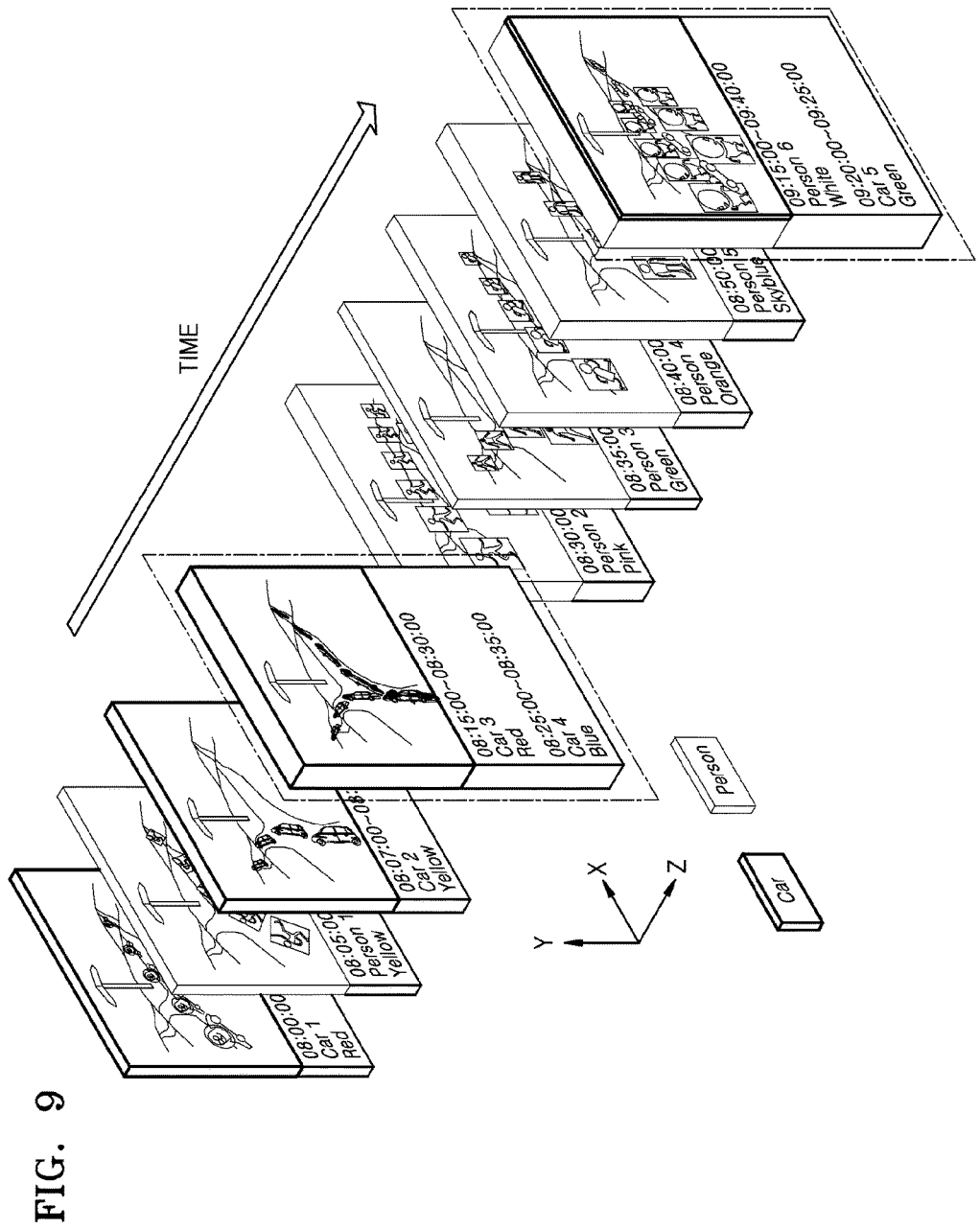
FIG. 9 is an exemplary view illustrating an interaction between summary images aligned on a screen according to an embodiment of the present invention.

FIG. 9 is an exemplary view illustrating an interaction between summary images aligned on a screen according to an embodiment of the present invention.

FIG. 9 illustrates a synthesized summary image obtained by merging fourth and fifth summary images and a synthesized summary image obtained by merging tenth and eleventh summary images. Selected summary images may be merged when the user moves a mouse on layers. Alternatively, a plurality of summary images whose time intervals partially overlap one another may be automatically merged. Accordingly, the user may recognize an interaction between different objects as well as a motion of each object.

A synthesized summary image may have a thickness obtained by summing thicknesses of summary images that are not merged yet. When summary images of objects belonging to different categories are merged, an edge of a synthesized summary image may show all edge colors according to the categories.

A synthesized summary image may be displayed on the whole or a part of a screen so that the user see the synthesized summary image, or may be instantaneously highlighted, or may be disposed over other summary images.

The image browsing system may receive an input that selects a summary image from among the aligned summary images, may highlight the selected summary image, and may separately display the highlighted summary image so that the highlighted summary image overlaps remaining summary images. In this case, the image browsing system may add a replay icon to the highlighted summary image, and when an input that activates the replay icon is received, may continuously replay a motion of an object in the selected summary image. Alternatively, the image browsing system may replay a video including a time interval of the summary image to be replayed.

Figure 10:
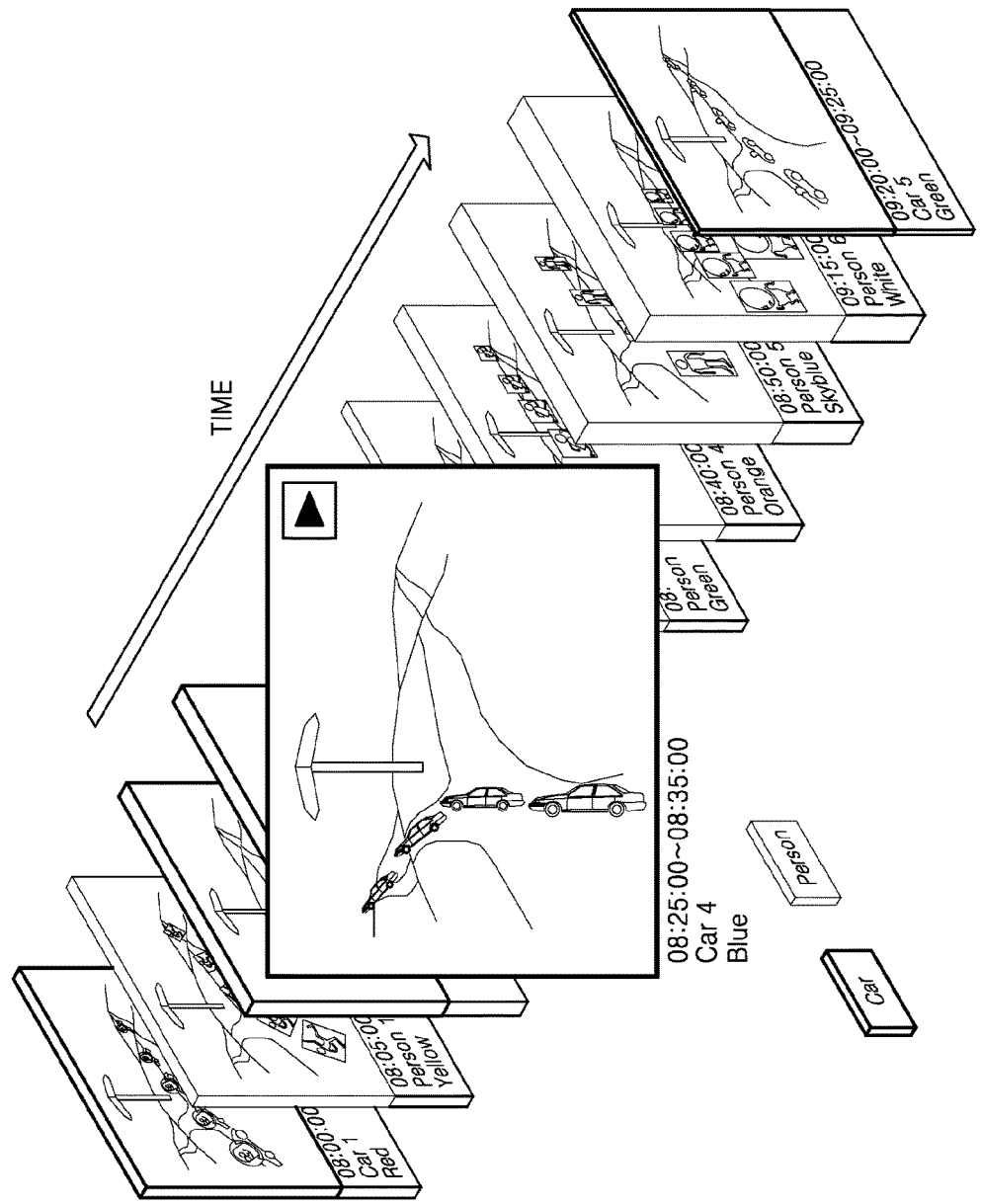
FIG. 10 is a view illustrating an example wherein a summary image of interest is highlighted on a screen according to an embodiment of the present invention.

FIG. 10 is a view illustrating an example wherein a summary image of interest is highlighted on a screen according to an embodiment of the present invention.

Referring to FIG. 10, when the user selects a summary image of interest on a layer, the selected summary image may be highlighted, and as a replay icon is activated, an operation of moving an object in the highlighted summary image along a motion trajectory may be replayed. Alternatively, as the replay icon is activated, an original video including a time interval of the highlighted summary image may be replayed.

The image browsing system may receive a request to remove or add a background from or to one or more summary images from among the aligned summary images, and may display the summary images after removing or adding the background from or to the one or more summary images.

Figure 11:
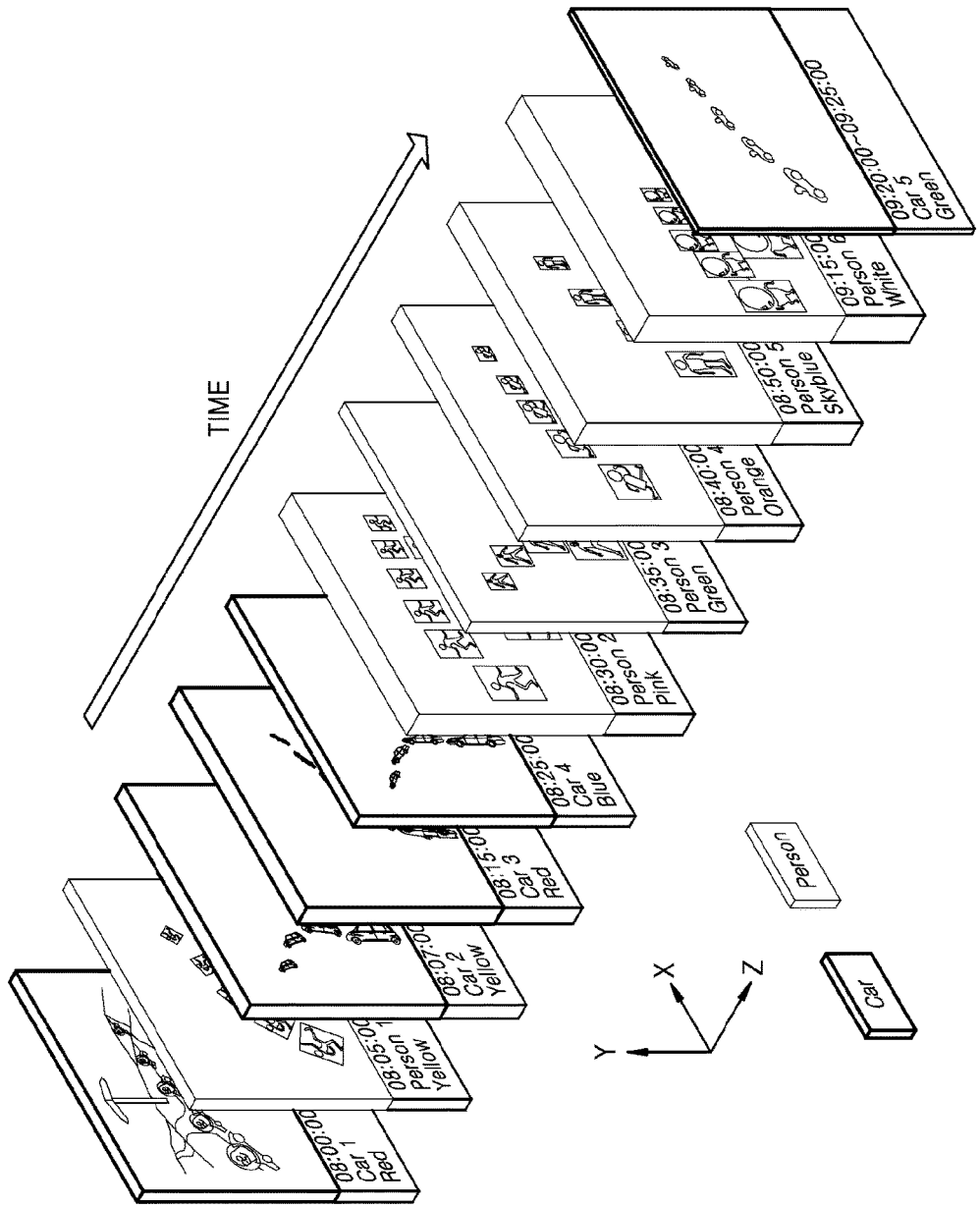
FIG. 11 is an exemplary view illustrating summary images, from or to which a background is removed or added, aligned on a screen according to an embodiment of the present invention.

FIG. 11 is an exemplary view illustrating summary images, from or to which a background is removed or added, aligned on a screen according to an embodiment of the present invention.

Referring to FIG. 11, a background image is removed, and only objects of interest are displayed. When the user re-selects a summary image of interest on a layer, the background image may be added to the selected summary image. In FIG. 11, the background image is displayed only on a summary image on a lowermost layer, and the background image is removed from remaining summary images.

The image browsing system may cluster summary images that are searched for according to search conditions. When a request to perform clustering is received from the user, the image browsing system may perform clustering and visualization according to the number of summary images, that is, the number of objects, corresponding to each search condition and a user may recognize content of each of the search conditions. A size of each cluster indicates a probability that a search condition corresponding to the cluster occurs. Accordingly, a probability that a search condition occurs and a content trend may be recognized immediately according to a size of a cluster.

Figure 12:
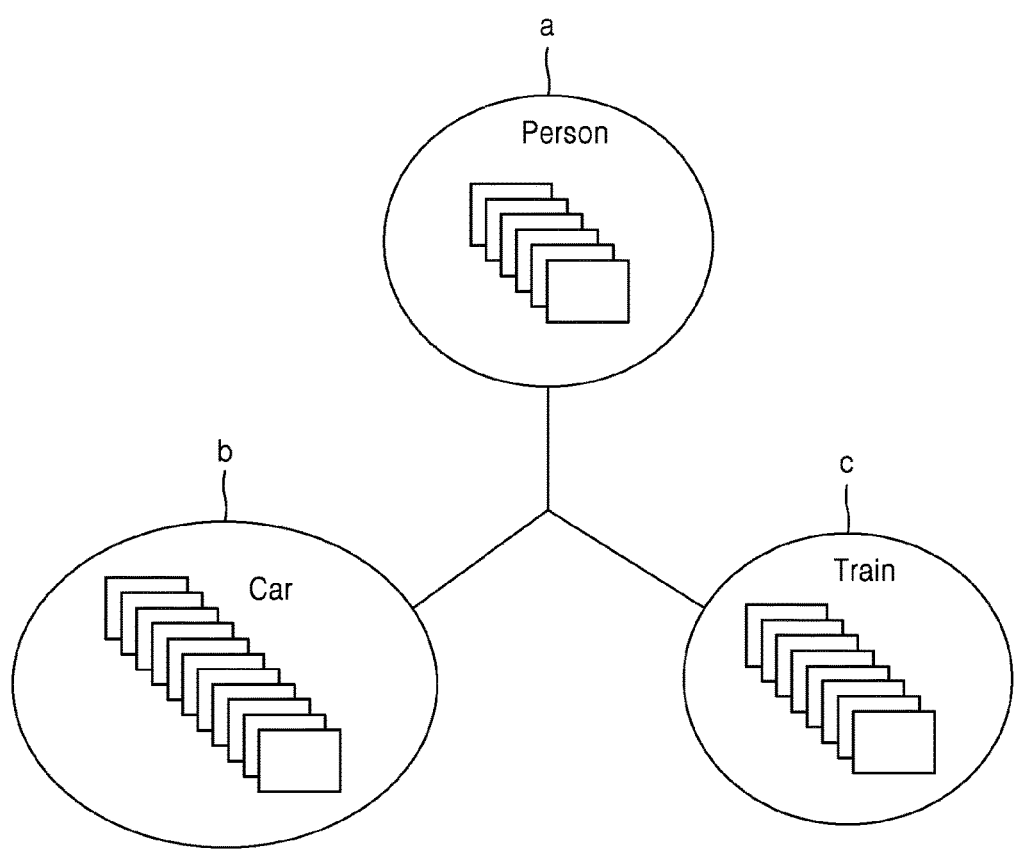
FIG. 12 is an exemplary view illustrating clustering of summary imaged displayed on a screen according to an embodiment of the present invention.

FIG. 12 is an exemplary view illustrating clustering of summary images displayed on a screen according to an embodiment of the present invention.

FIG. 12 illustrates a cluster 'a' of summary images, which is a search result according to a first search condition (e.g., persons), a cluster 'b' of summary images, which is a search result according to a second search condition (e.g., cars), and a cluster 'c' of summary images, which is a search result according to a third search condition (e.g., trains). The user may recognize a content trend by recognizing a probability that each search condition occurs from a size of each cluster in the search condition.

According to an embodiment of the present invention, since a summary image is an object-based image, instead of a summary video, a motion trajectory of an object may be recognized immediately, and since images are arranged in a 3D structure, user convenience may be improved.

A summary image browsing method according to the present invention may be embodied as computer-readable codes in a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. Also, the computer-readable recording medium may be distributed among computer systems that are interconnected through a network, and the present invention may be stored and implemented as computer-readable codes in the distributed system. Functional programs, codes, and code segments for embodying the present invention may be easily derived by programmers in the technical field to which the present invention pertains.

The invention claimed is:

1. A method for browsing summary images comprising:
   tracking, by an object extractor, a motion trajectory of an object from an input video;
   extracting, by the object extractor, the object from the input video and generating a series of object segments;
   synthesizing, by a summary image generator, the series of object segments with a background image along the motion trajectory of the object; and
   generating, by the summary image generator, a summary image having a thickness proportional to an appearance duration of the object extracted from the input video.

2. The method of claim 1, wherein the summary image comprises a display region and a text region indicating information of the object, and a specific color is assigned to an edge of the display region according to a category of the object.

3. The method of claim 1, wherein the series of object segments are arranged not to overlap the background image along the motion trajectory of the object, wherein each of the object segments in the series of object segments is displayed in a specific color or a specific figure and has a size that varies according to a position thereof in the background image.

4. The method of claim 1, further comprising:
aligning and displaying, along a time axis in an order in which a plurality of objects appear over time, one or more summary images matching a search condition, from among summary images generated according to the plurality of objects.

5. The method of claim 4, further comprising:
receiving an input for changing view points of the aligned summary images; and
rotating and moving the aligned summary images based on transformation relationships respectively assigned to the aligned summary images and displaying the rotated and moved summary images.

6. The method of claim 4, further comprising:
detecting an operation of dragging and dropping a first summary image to a second summary image, from among the aligned summary images; and
aligning and displaying a synthesized summary image, which is obtained by synthesizing the first summary image with the second summary image, with remaining summary images.

7. The method of claim 4, further comprising aligning and displaying a synthesized summary image, which is obtained by synthesizing one or more summary images, from among the aligned summary images, whose appearance durations partially overlap, with remaining summary images.

8. The method of claim 7, wherein the displaying of the synthesized summary image comprises aligning and displaying a synthesized summary image, which is obtained by synthesizing a summary image selected by a user with one or more summary images, from among the aligned summary images, whose appearance durations partially overlap, with remaining summary images.

9. The method of claim 4, further comprising:
receiving a request to re-align the aligned summary images according to categories; and
classifying the aligned summary images according to the categories, and aligning and displaying the classified summary images in each of the categories along the time axis in an order in which objects appear over time.

10. The method of claim 4, further comprising:
receiving an input for selecting a summary image from among the aligned summary images; and
highlighting the selected summary image, and separately displaying the highlighted summary image so that the highlighted summary image overlaps remaining summary images.

11. The summary image browsing method of claim 10, further comprising:
adding a replay icon to the highlighted summary image; and
when the replay icon is selected, replaying an object of the highlighted image in a time order.

12. The method of claim 4, further comprising:
receiving a request to remove or add a background from or to one or more summary images from among the aligned summary images; and displaying the one or more summary images after removing or adding the background from or to the one or more summary images.

13. The method of claim 4, further comprising:
clustering summary images that are searched according to search conditions.

14. A system for browsing summary images comprising:
an object extractor configured to track a motion trajectory of an object from an input video and generate a series of object segments by extracting the object from the input video; and
a summary image generator configured to synthesize the series of object segments with a background image along the motion trajectory of the object and generate a summary image having a thickness proportional to an appearance duration of the object extracted from the input video.

15. The system of claim 14, wherein the summary image comprises a display region and a text region indicating information of the object, and a specific color is assigned to an edge of the display region according to a category of the object, and
the series of object segments are arranged not to overlap the background image along the motion trajectory of the object,
wherein each of the object segments in the series of object segments is displayed in a specific color or a specific figure and has a size that varies according to a position thereof in the background image.

16. The system of claim 14, further comprising:
a browsing engine configured to align and display, along a time axis in an order in which a plurality of objects appear over time, one or more summary images matching a search condition from among summary images generated according to the plurality of objects.

17. The system of claim 16, wherein the browsing engine is configured to rotate and move, in response to a request to change view points of the aligned summary images, the aligned summary images based on transformation relationships respectively assigned to the aligned summary images and display the rotated and moved summary images.

18. The system of claim 16, wherein the browsing engine is configured to align and display, according to a user selection or partially overlapping object appearance durations, a synthesized summary image, which is obtained by synthesizing some summary images from among the aligned summary images, with remaining summary images.

19. The system of claim 16, wherein the browsing engine is configured to highlight a summary image selected from among the aligned summary images and separately display the highlighted summary image so that the highlighted summary image overlaps remaining summary images,
wherein a replay icon is added to the highlighted image, and when an input for selecting the replay icon is received, an object in the highlighted summary image is replayed in a time order.

20. The system of claim 16, wherein the browsing engine is configured to cluster summary images that are searched according to search conditions.

* * * * *